US012703150B2

(12) United States Patent
Engelhardt et al.

(10) Patent No.: US 12,703,150 B2
(45) Date of Patent: Aug. 11, 2026

(54) OPTICAL UNIT AND SYSTEM FOR PRODUCING A THREE-DIMENSIONAL WORKPIECE

(71) Applicant: Nikon SLM Solutions AG, Luebeck (DE)

(72) Inventors: Axel Engelhardt, Luebeck (DE); Eduard Gieser, Luebeck (DE); Markus Mallmann, Pöcking (DE); Manuel Wiedmann, Greifenberg (DE); Andreas Hermann, Munich (DE)

(73) Assignees: Nikon SLM Solutions AG, Luebeck (DE); RAYLASE GmbH, Weßling (DE)

( * ) Notice: Subject to any disclaimer, the term of this patent is extended or adjusted under 35 U.S.C. 154(b) by 830 days.

(21) Appl. No.: 17/625,178

(22) PCT Filed: Jul. 3, 2020

(86) PCT No.: PCT/EP2020/068793

§ 371 (c)(1),
(2) Date: Jan. 6, 2022

(87) PCT Pub. No.: WO2021/004926

PCT Pub. Date: Jan. 14, 2021

(65) Prior Publication Data

US 2022/0194002 A1 Jun. 23, 2022

(30) Foreign Application Priority Data

Jul. 8, 2019 (DE) ..................... 10 2019 118 408.8

(51) Int. Cl.
*B29C 64/268* (2017.01)
*B29C 64/245* (2017.01)
(Continued)

(52) U.S. Cl.
CPC .......... *B29C 64/268* (2017.08); *B29C 64/245* (2017.08); *B29C 64/25* (2017.08); *B29C 64/277* (2017.08); *B33Y 30/00* (2014.12)

(58) Field of Classification Search
CPC ........ B22F 10/28; B22F 12/45; B23K 26/702; B29C 64/245; B29C 64/25; B29C 64/264;
(Continued)

(56) References Cited

U.S. PATENT DOCUMENTS

2011/0259862 A1 10/2011 Scott et al.
2013/0112672 A1 5/2013 Keremes et al.
(Continued)

FOREIGN PATENT DOCUMENTS

CN 202591611 U * 12/2012 ............ B22F 3/1055
CN 102905905 1/2013
(Continued)

OTHER PUBLICATIONS

FIT translation CN 202591611U, Yang, Dec. 2012.*
(Continued)

*Primary Examiner* — Philip C Tucker
*Assistant Examiner* — Jimmy R Smith, Jr.
(74) *Attorney, Agent, or Firm* — Williams Mullen; Thomas F. Bergert

(57) ABSTRACT

The invention relates to an optical unit for use in an apparatus for producing a three-dimensional workpiece by a beam melting process. The optical unit comprises a beam optics for generating a beam and directing the beam to a predetermined location, and a housing having a housing bottom and an opening provided in the housing bottom which is transparent to the beam so that the beam can pass through the opening. The optical unit has a lower section comprising the housing bottom and having two side walls each extending parallel to a first direction, and an upper
(Continued)

section connected to the lower section and having two side walls each extending parallel to the first direction, the lower section and the upper section being arranged offset from each other such that a first side wall of the side walls of the lower section does not extend in the same plane as a first side wall of the side walls of the upper section and a second side wall of the side walls of the lower section does not extend in the same plane as a second side wall of the side walls of the upper section. Furthermore, the invention relates to an apparatus for producing a three-dimensional workpiece.

14 Claims, 7 Drawing Sheets

(51) Int. Cl.
*B29C 64/25* (2017.01)
*B29C 64/277* (2017.01)
*B33Y 30/00* (2015.01)

(58) Field of Classification Search
CPC ..... B29C 64/268; B29C 64/277; B33Y 30/00; B33Y 99/00
See application file for complete search history.

(56) References Cited

U.S. PATENT DOCUMENTS

| | | | | |
|---|---|---|---|---|
| 2013/0176375 | A1* | 7/2013 | Moench | B41J 2/447 347/225 |
| 2016/0114432 | A1 | 4/2016 | Ferrar et al. | |
| 2017/0239724 | A1* | 8/2017 | Diaz | B33Y 50/02 |
| 2018/0133982 | A1* | 5/2018 | Yen | B29C 64/245 |
| 2018/0207871 | A1 | 7/2018 | Miki et al. | |
| 2018/0326485 | A1 | 11/2018 | Brown | |

FOREIGN PATENT DOCUMENTS

| | | |
|---|---|---|
| CN | 105451971 | 3/2016 |
| CN | 105980159 | 9/2016 |
| CN | 106111985 | 11/2016 |
| CN | 106312325 | 11/2017 |
| CN | 107428078 | 12/2017 |
| DE | 102016218887 | 3/2018 |
| EP | 2186625 | 5/2010 |
| EP | 2335848 | 6/2011 |
| EP | 2342042 | 7/2011 |
| EP | 2878402 | 6/2015 |
| EP | 2961549 | 1/2016 |
| JP | 2013527809 | 7/2013 |
| JP | 2019504182 | 2/2019 |
| WO | 2010026397 | 3/2010 |
| WO | 2011066989 | 6/2011 |
| WO | 2017085470 | 5/2017 |
| WO | 2018060119 | 4/2018 |
| WO | 2018172092 | 9/2018 |
| WO | 2019032224 | 2/2019 |

OTHER PUBLICATIONS

Search Report for German Patent Application No. 10 2019 118 408.8, German Patent and Trademark Office, Mar. 17, 2020.

International Search Report and Written Opinion for PCT/EP2020/068793, European Patent Office, Sep. 11, 2020.

Japanese Patent Office, Japanese Examination Report for JP2022-500870, Feb. 21, 2023.

China National Intellectual Property Administration, Examination Report for International Patent Application No. CN 202080054220.6, Apr. 28, 2023.

China National Intellectual Property Administration, Chinese Examination Report for CN202080054220.6, Dec. 1, 2023.

* cited by examiner

OPTICAL UNIT AND SYSTEM FOR PRODUCING A THREE-DIMENSIONAL WORKPIECE

CROSS-REFERENCE TO RELATED APPLICATIONS

This application is based on international patent application PCT/EP 2020/068793 and claims the benefit of the German patent application No. 10 2019 118 408.8 filed on Jul. 8, 2019, the entire disclosures of which are incorporated herein by way of reference.

BACKGROUND

The invention relates to an optical unit for use in an apparatus for producing a three-dimensional workpiece and to a corresponding apparatus. The production of the three-dimensional workpiece may be a production by means of a generative layer construction process and in particular by means of a beam melting process.

BACKGROUND OF THE INVENTION

In generative processes for producing three-dimensional workpieces and in particular in generative layer construction processes, it is known to apply an initially shapeless or shape-neutral molding compound of a raw material (for example, a raw material powder) layer by layer to a carrier and to solidify it by site-specific irradiation (e.g., by melt fusing or sintering) in order to ultimately obtain a workpiece of a desired shape. The irradiation may be performed using electromagnetic radiation, for example in the form of laser radiation. In an initial state, the molding compound may initially be in the form of granules, a powder or a liquid molding compound and may be selectively or, in other words, site-specifically solidified as a result of the irradiation. The molding compound may comprise, for example, ceramic, metal, or plastic materials, and may also comprise mixtures of materials thereof. One variant of generative layer construction processes relates to the so-called laser beam melting in a powder bed, in which, in particular, metallic and/or ceramic raw material powder materials are solidified into three-dimensional workpieces under irradiation of a laser beam.

For the production of individual workpiece layers, it is also known to apply raw material powder material in the form of a raw material powder layer to a carrier and to irradiate it selectively and in accordance with the geometry of the workpiece layer currently to be produced. The laser radiation penetrates the raw material powder material and solidifies it, for example as a result of heating, which causes melting or sintering. Once a workpiece layer is solidified, a new layer of unprocessed raw material powder material is applied to the already produced workpiece layer. Known coater arrangements or powder application devices may be used for this purpose. Subsequently, a new irradiation of the now uppermost and still unprocessed raw material powder layer is carried out. Consequently, the workpiece is successively built up layer by layer, each layer defining a cross-sectional area and/or a contour of the workpiece. In this context, it is further known to make use of CAD or comparable workpiece data in order to manufacture the workpieces substantially automatically.

A known optical irradiation unit, which can be used, for example, in an apparatus for producing three-dimensional workpieces by irradiating raw materials, is described in EP 2 335 848 B1. The known irradiation unit comprises a beam source, in particular a laser source, and various optical components, such as a beam expander, a focusing unit, and a deflection device in the form of a scanner unit and a lens.

It is to be understood that, within the context of the present invention, all of the aspects explained above may also be provided and that an optical unit according to the present disclosure may in particular comprise the optical components mentioned above.

Known devices for producing three-dimensional workpieces can also be found, for example, in EP 2 961 549 A1 and in EP 2 878 402 A1.

In the course of increasing build volumes and the associated possibility of producing larger workpieces, the corresponding build processes take longer and longer if only one beam source is used. In this context in particular, an increase in process productivity is desirable. This can be achieved by directing several laser beams simultaneously onto the raw material.

One way of being able to generate multiple laser beams simultaneously is to provide multiple optical units, each optical unit being arranged to emit a laser beam and direct it to a predetermined location on the raw material.

In particular, in the case described above where multiple optical units are provided, but also where only one optical unit is provided, it may be that the space for the optical unit(s) is limited, so that it is desirable to make the optical unit(s) as compact as possible. In other words, it may be desirable to make the most efficient use of the volume taken up for the optical components. In the event that a plurality of optical components are to be provided side by side, it is desirable that the housing of the optical units is configured to allow a simple and space-saving arrangement of the optical units side by side.

SUMMARY

It is therefore an object of the invention to provide an optical unit having an improved geometry and an associated apparatus.

This object is solved by an optical unit with the features of claim 1 as well as an apparatus with the features of claim 7.

Accordingly, in accordance with a first aspect, the invention relates to an optical unit for use in an apparatus for producing a three-dimensional workpiece by a beam melting process. The optical unit comprises a beam optics for generating a beam and directing the beam to a predetermined location, and a housing having a housing bottom and an opening provided in the housing bottom which is transparent to the beam so that the beam can pass through the opening. The optical unit comprises a lower section including the housing bottom and having two side walls each extending parallel to a first direction, and an upper section connected to the lower section and having two side walls each extending parallel to the first direction, wherein the lower section and the upper section are arranged offset from each other such that a first side wall of the side walls of the lower section does not extend in the same plane as a first side wall of the side walls of the upper section and a second side wall of the side walls of the lower section does not extend in the same plane as a second side wall of the side walls of the upper section.

The beam melting process may be, for example, selective laser melting or selective laser sintering. The beam optics of the optical unit may comprise a beam source and in particular a laser beam source. For example, a Nd:YAG laser may be used for this purpose, which generates a laser beam having a wavelength of 1064 nm. The beam optics may comprise further optical elements which are suitable for shaping, deflecting, or otherwise influencing the generated laser beam. In particular, one or more of the following non-exhaustive list may be provided as optical elements: a beam expander for expanding the laser beam, a focusing unit for changing a focus position of the laser beam along a beam direction of the laser beam, a scanning unit for two-dimensionally scanning the laser beam over a top layer of raw material, a spatial modulator for light (SLM) for imposing a spatial modulation on the laser beam, a beam splitting unit for splitting the laser beam into a plurality of partial beams, and an objective lens such as an f-theta lens. The predetermined location to which the laser beam is directed may be a predetermined position on a top layer of the raw material.

The housing bottom may be oriented in an installed state of the optical unit such that a surface normal of the housing bottom points in the direction of the deposited raw material layer(s). The opening in the housing bottom may, but need not, be completely surrounded by the housing bottom. The relevant characteristic of the opening is that the beam can pass through it. For example, the opening may comprise a pane (e.g. a glass pane) which is transparent to the beam and in particular transparent to a wavelength of the laser beam. The pane may provide for an airtight seal of the optical unit. Further, the opening may also merely be an unsealed and thus air-filled opening or recess.

For example, the side walls may be configured such that the two side walls of the lower section and the two side walls of the upper section are parallel to a plane that is perpendicular to a plane in which the bottom of the housing extends. Thus, in the context of the coordinate system defined herein, these side walls may be parallel to an x-z plane, for example. The first sidewall of the lower section may be parallel to the first sidewall of the upper section. Similarly, the second side wall of the lower section may be parallel to the second side wall of the upper section. For example, the two side walls of the upper section may be offset by the same distance and in the same direction with respect to the two side walls of the lower section. This direction may be the y-direction defined herein, which is perpendicular to the first direction (x-direction). The offset defined above may allow for a compact design of the optical unit. The lower section and the upper section may each be substantially in the form of a parallelepiped. A width of the lower section along the direction of the offset (i.e., in the y-direction in the coordinate system defined herein) may be identical to a width of the upper section along the direction of the offset.

Generally, the optical unit described herein may be configured to be positioned between two further identical optical units such that side walls of the respective optical units are adjacent to each other.

For example, the optical unit having the shape described above with a lower section and an upper section may be configured such that a further identical optical unit may be placed adjacent to the optical unit such that the second side wall of the lower section of the optical unit is disposed adjacent to a first side wall of a lower section of the further optical unit and the second side wall of the upper section of the optical unit is disposed adjacent to a first side wall of an upper section of the further optical unit.

The above-described adjacent arrangement may mean that the respective side walls are immediately adjacent to each other, with only a narrow air gap between the respective side walls. The air gap may have a width that is less than 20%, than 10%, than 5%, than 2%, or than 1% of a width of the upper section measured along a direction along which the respective optical components are arranged adjacent to each other (for example, along the y-direction). In particular, the adjacent arrangement may mean that no component other than the respective optical units is located between the respective sidewalls. The respective adjacent sidewalls may be parallel to each other.

The side walls of the lower section may be parallel to each other, and the side walls of the upper section may also be parallel to each other. Independent thereof, a first connecting surface may connect the first side wall of the lower section to the first side wall of the upper section and a second connecting surface may connect the second side wall of the lower section to the second side wall of the upper section.

The connecting surfaces may be configured such that, in an adjacent arrangement of identical optical units, the first side wall of the optical unit is adjacent to and parallel to a second side wall of an adjacent optical unit.

The optical unit may further comprise at least one roller provided at the housing bottom, by means of which the optical unit can be rolled along at least the first direction, the first direction corresponding to a rolling direction.

When the rolling direction is mentioned herein, the first direction is meant. For example, in the coordinate system defined herein, this rolling direction or first direction corresponds to the x-direction.

The at least one roller may be provided on the housing bottom such that it is partially recessed therein. For example, an axis of rotation of the roller may extend within the optical unit or at least within the housing bottom. However, the roller may otherwise be provided on the housing bottom in any manner such that it allows for a desired rolling motion of the optical unit. The roller may be substantially cylindrical in shape. The roller may allow a substantially linear rolling motion in the rolling direction. Although a limitation that the rollers are capable of movement in only one rolling direction will be introduced hereinafter, rollers may also be provided which allow rolling movement in more than one rolling direction, for example in any direction within a plane. For this purpose, the rollers may, for example, be rotatably mounted about an axis which is perpendicular to the respective rolling axis of the roller, or the rollers may be designed as balls. When in the following the (one) rolling direction is referred to, this rolling direction is defined along the x-axis in an x-y-plane. Alternatively, the rolling direction could also be defined along the y-axis.

The provision of the at least one roller may allow the optical unit to be rolled over a receiving portion of an apparatus for producing a three-dimensional workpiece (within an x-y plane), such that placement of the optical unit onto the receiving portion (along a z-direction) does not have to occur at the location of an intended end position of the optical unit. However, since the optical units may be heavy and/or bulky, initial loading of optical units onto an apparatus for producing a three-dimensional workpiece may be difficult and costly. Furthermore, the individual optical units may in principle be interchangeable in order to be able to remove individual optical elements for repair or maintenance even after initial assembly, or to be able to replace such optical elements (for example, after a defect or if an optical element with different properties, such as a different wavelength or laser power, is desired). However, such replacement is often not possible in the prior art without having to completely remove or at least change the position of other optical units (besides the one to be replaced). This makes the removal and installation of the optical units difficult and costly. For this situation, the at least one roller proposed herein offers an improvement in that the optical units can be "rolled in" laterally (along the rolling direction).

The optical unit may have at least three rollers provided at the housing bottom, all of which are offset from each other along a direction perpendicular to the rolling direction.

In other words, this offset means that no two of these at least three rollers run along the same straight line (in the x-direction). Rather, the straight lines along which the individual rollers run may be parallel along the x-direction and be spaced apart from each other (along a y-direction). In addition to the at least three offset rollers, additional rollers may be provided that are also offset as described above or have no offset (along the y-direction) with respect to one of the at least three rollers. If at least three offset rollers are provided, an associated groove may be provided in the receiving portion of the apparatus for each of the rollers.

The housing bottom may comprise a hole adapted to receive a fastener. The hole may have a thread adapted to receive a screw. For example, the hole may extend along a direction perpendicular to the rolling direction (e.g. z-direction). The hole may serve to secure the optical unit to a receiving portion of an apparatus by means of the fastener.

For the sake of clarification only, it should be mentioned that for the purposes of the invention, the housing bottom is also understood to be a housing bottom when it is completely occupied by the aforementioned opening, i.e. when the hole is delimited by the side walls. The hole can be filled by a laser-transparent material, for example glass, but it can also be designed as a material-permeable opening.

According to a second aspect, the invention relates to an apparatus for producing a three-dimensional workpiece by means of a beam melting process. The apparatus comprises a carrier for receiving a plurality of layers of a raw material, a receiving portion disposed above the carrier and having at least one groove provided in the receiving portion, and the optical unit according to the first aspect. The at least one roller of the optical unit and the at least one groove of the receiving portion are configured such that the at least one roller can roll along and is guided by the at least one groove.

For example, the groove may extend along a straight line, particularly along the x-direction defined herein. For example, the groove may have a substantially rectangular cross-section. A bottom surface of the groove may be parallel to the x-y plane such that the associated roller of the optical unit may roll thereon along the x-direction.

For each of the rollers of the optical unit (exactly) one associated groove may be provided in the receiving portion. For example, if the optical unit has three rollers, three associated grooves may be provided in the receiving portion.

Alternatively, however, at least two rollers may be provided which can be guided together in the same groove. Thus, for example, the optical unit can have four rollers, wherein respective two of the four rollers can be guided in a common groove.

The at least one groove may have a recess at an end portion of the groove for receiving an associated roller of the optical unit, the recess being provided with respect to a bottom surface of the groove.

More specifically, the groove may be a "depression" or recess in the receiving portion, the bottom surface of the groove being at a lower level (in the z-direction) than a surface of the receiving portion. Starting from this level of the bottom surface, a further recess is provided along the z-direction at the end portion of the groove. This recess may serve to allow the associated optical unit to engage in an end position. From this end position, the optical unit cannot be removed by merely rolling along only the x-direction, as it is additionally necessary to remove the roller (in the x-direction) from the recess. For each roller of the optical unit, a recess may be provided in an associated groove.

The recess may be configured such that the associated roller does not contact a bottom of the recess when the associated roller is received by the recess and the optical unit is in an end position. Thus, in the end position, a surface of the receiving portion and the housing bottom of the optical unit may contact each other. In the end position, the optical unit is thus engaged and rests flatly and stably on the surface of the receiving portion.

An inclined transition surface may be provided between the bottom surface of the groove and the recess.

The transition surface can be, for example, a ramp. The transition surface can be an inclined plane, but can also be curved. The roller can roll over the transition surface into the recess and out of the recess again.

The apparatus may further comprise at least one fastener adapted to be inserted into the hole of the housing bottom of the optical unit, so as to fasten the optical unit to the receiving portion of the apparatus.

The fastener may be, for example, a screw or a bolt. When the optical unit is in an end position, the fastener can be inserted into the hole along the z-direction to fix the optical unit to the receiving portion. For this purpose, the receiving portion may for example also comprise a hole and in particular a threaded hole.

Alternatively or in addition to the provided recess, the at least one roller or the rollers of the optical unit may be resiliently supported. In this way, by applying pressure to an upper surface of the optical unit (downward in the z-direction), a surface of the receiving portion and the housing bottom of the optical unit may be caused to approach and eventually contact each other at a final position.

The receiving portion may have an opening transparent to the beam and adapted to at least partially overlap with the opening of the optical unit in an end position of the optical unit, so that the beam can be directed through the opening of the optical unit and through the opening of the receiving portion.

The end position may be a fastened state in which the optical unit is fastened to the receiving portion. The opening of the receiving portion may be, for example, only a recess. However, a pane (e.g., glass pane) that is transparent to the laser beam may also be provided in the opening. The opening serves to allow the laser beam to be directed from the optical unit, through the receiving portion, onto the raw material.

A seal extending around the opening of the receiving portion and/or around the opening of the optical unit may be provided.

The seal can serve to provide a gas-tight seal to a build chamber below the receiving portion, so that no gas can escape from the build chamber into the environment and/or into the optical unit.

The apparatus may comprise a plurality of optical units according to the first aspect which are arranged side by side.

The optical units may be arranged side by side along a direction perpendicular to the rolling direction (for example, along the y-direction). Additionally or alternatively, the optical units may be arranged side by side along the rolling direction (for example, along the x-direction). In particular, for example, a predetermined number of optical units (for example, six) may be arranged side by side along the y-direction in a first row and the same predetermined number of optical units may be arranged along the y-direction in a second row, the two rows being arranged side by side along the x-direction.

According to a third aspect, the invention relates to an optical unit for use in an apparatus for producing a three-dimensional workpiece by a beam melting process. The optical unit comprises a beam optics for generating a beam and for directing the beam to a predetermined location, a housing having a housing bottom and an opening provided in the housing bottom which is transparent to the beam so that the beam can pass through the opening, and at least one roller provided at the housing bottom by means of which the optical unit can be rolled along at least one rolling direction.

An optical unit formed in this way can also be claimed independently of the combination of features defined in claim 1. In particular, for an optical unit formed in such a way, the feature that the optical unit comprises a lower section comprising the housing bottom and having two side walls each extending parallel to a first direction, and an upper section connected to the lower section and having two side walls each extending parallel to the first direction, wherein the lower section and the upper section are offset from each other such that a first side wall of the lower section side walls does not extend in the same plane as a first side wall of the upper section side walls and a second side wall of the lower section side walls does not extend in the same plane as a second side wall of the upper section side walls, is not essential.

Features explained above in connection with the first and second aspects of the invention may also be provided in the optical unit according to the third aspect of the invention.

In particular, the optical unit may comprise at least three rollers provided at the bottom of the housing, all of which may be offset from each other along a direction perpendicular to the rolling direction.

The bottom of the housing may comprise a hole adapted to receive a fastener.

The optical unit may comprise a lower section comprising the bottom of the housing and having two side walls each extending parallel to the rolling direction, and an upper section connected to the lower section and having two side walls each extending parallel to the rolling direction. The lower section and the upper section are offset from each other such that a first side wall of the side walls of the lower section does not extend in the same plane as a first side wall of the side walls of the upper section and a second side wall of the side walls of the lower section does not extend in the same plane as a second side wall of the side walls of the upper section.

Generally, the optical unit described herein may be configured to be positioned between two further identical optical units such that side walls of the respective optical units are adjacent to each other.

For example, the optical unit having the shape described above with a lower section and an upper section may be configured such that a further identical optical unit may be placed adjacent to the optical unit such that the second side wall of the lower section of the optical unit is disposed adjacent to a first side wall of a lower section of the further optical unit and the second side wall of the upper section of the optical unit is disposed adjacent to a first side wall of an upper section of the further optical unit.

The side walls of the lower section may be parallel to each other, and the side walls of the upper section may also be parallel to each other. Independent thereof, a first connecting surface may connect the first side wall of the lower section to the first side wall of the upper section and a second connecting surface may connect the second side wall of the lower section to the second side wall of the upper section.

According to a fourth aspect, the invention relates to an apparatus for producing a three-dimensional workpiece by means of a beam melting process. The apparatus comprises a carrier for receiving a plurality of layers of a raw material, a receiving portion arranged above the carrier and having at least one groove provided in the receiving portion, and the optical unit according to the third aspect. The at least one roller of the optical unit and the at least one groove of the receiving portion are configured such that the at least one roller can roll along and is guided by the at least one groove.

An optical unit so formed can also be defined independently of the feature combination defined in claim 7. In particular, for an optical unit so formed, the feature of claim 1 that the optical unit comprises a lower section comprising the housing bottom and having two side walls each extending parallel to a first direction, and an upper section connected to the lower section and having two side walls each extending parallel to the first direction, wherein the lower section and the upper section are offset from each other such that a first side wall of the lower section side walls does not extend in the same plane as a first side wall of the upper section side walls and a second side wall of the lower section side walls does not extend in the same plane as a second side wall of the upper section side walls, is not essential.

Features explained above in connection with the first, the second and the third aspect of the invention may also be provided in the apparatus according to the fourth aspect of the invention.

In particular, (exactly) one associated groove may be provided in the receiving portion for each of the rollers of the optical unit.

The at least one groove may have a recess at an end portion of the groove for receiving an associated optical unit roller, the recess being provided with respect to a bottom surface of the groove.

The recess may be configured such that the associated roller does not contact a bottom of the recess when the associated roller is received by the recess and the optical unit is in an end position.

An inclined transition surface may be provided between the bottom surface of the groove and the recess.

The apparatus may further comprise at least one fastener adapted to be inserted into the hole of the housing bottom of the optical unit so as to fasten the optical unit to the receiving portion of the apparatus.

The receiving portion may comprise an opening transparent to the beam and adapted to at least partially overlap with the opening of the optical unit in an end position of the optical unit, so that the beam can be directed through the opening of the optical unit and through the opening of the receiving portion.

A seal extending around the opening of the receiving portion and/or around the opening of the optical unit may be provided.

The apparatus may comprise a plurality of optical units according to the third aspect which are arranged side by side.

The invention will be explained below with reference to the accompanying figures. In the figures represent:

DETAILED DESCRIPTION OF EMBODIMENTS

Figure 1:
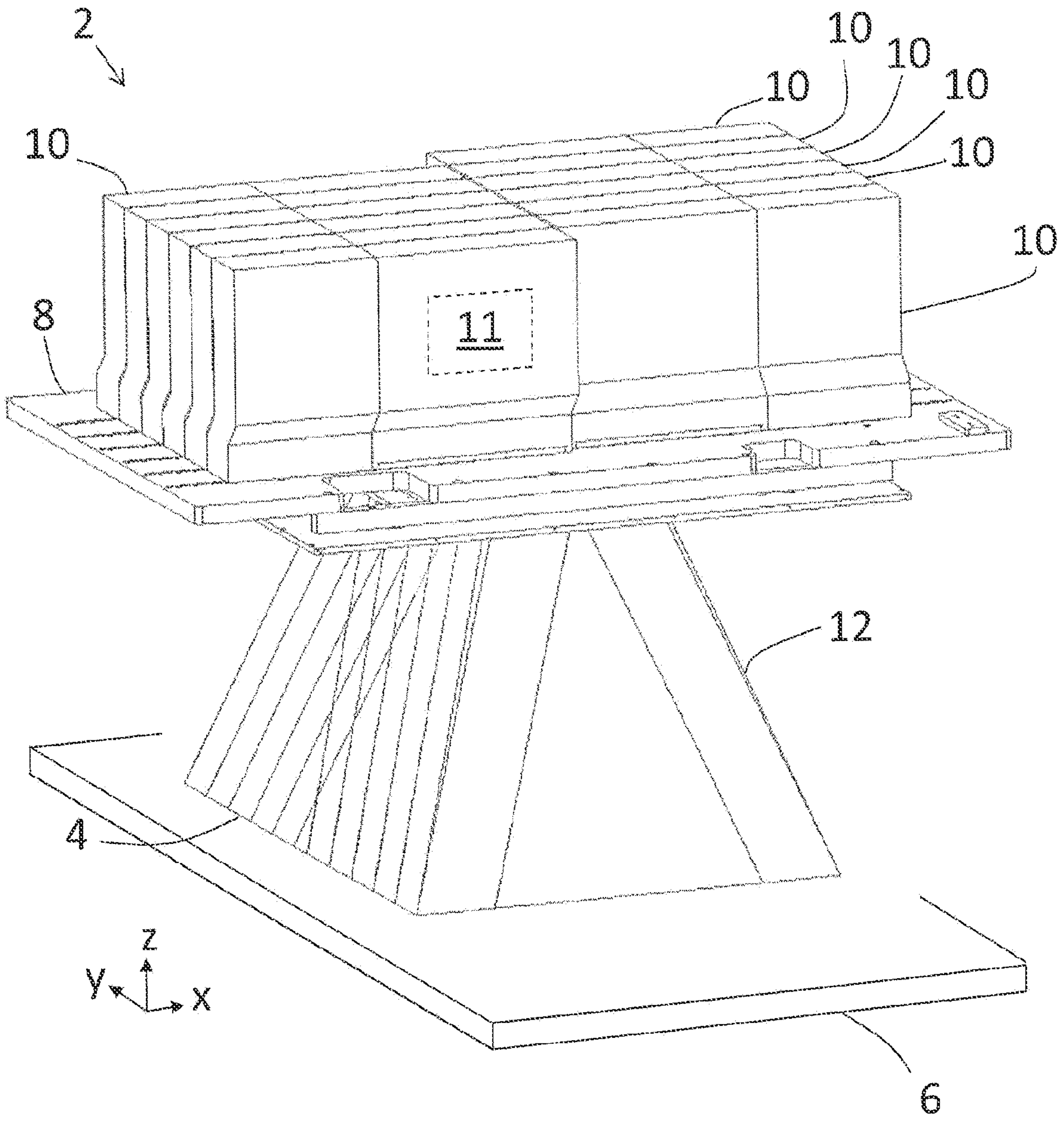
FIG. 1: a perspective view of a plurality of optical units which are arranged in two rows on a receiving portion.

FIG. 1 illustrates an embodiment of a portion of an apparatus 2 for producing a three-dimensional workpiece according to the present disclosure. The depicted portion represents an area which is located above a carrier 6, on which raw material is applied in the ongoing build process of the apparatus 2. Thus, in the ongoing build process, a top layer of raw material is located within a plane 4. The raw material may comprise, for example, a powder, a granulate and/or a liquid. The raw material may comprise, for example, metal, ceramic and/or a plastic material, or mixtures of materials thereof. The beam melting technique (for example, selective laser melting or selective laser sintering) used by the apparatus 2 is well known, for example, from the aforementioned prior art documents and will only be briefly explained herein with reference to selective laser melting in the powder bed.

First, a first layer of raw material powder is applied to the carrier 6 and illuminated by one or more laser beams in a location-specific manner such that desired areas of the powder are solidified. Subsequently, a further layer of powder is applied on top of the previous layer of powder and again illumination and solidification of this uppermost layer is performed. In order to keep a distance between the uppermost layer and the optical unit(s) always constant, it is possible to lower the carrier 6 and/or to raise the optical unit(s) 10 (along a z-direction) during the ongoing build process. In this way, the three-dimensional workpiece to be produced is built up layer by layer. Subsequently, the powder which has not solidified can be removed and, optionally, reused.

FIG. 1 shows a receiving portion 8 for receiving a plurality of optical units 10. More specifically, the receiving portion 8 shown enables the 12 optical units 10 shown to be received. In the embodiment shown, the receiving portion 8 represents a plate-shaped element which is arranged in the region of a ceiling of a build chamber of the apparatus 2 or represents this ceiling. Each of the illustrated optical units 10 is configured to irradiate a laser beam downwards (i.e. through an opening of the receiving portion 8) onto the plane 4 in which the raw material is located. Each of the illustrated optical units 10 comprises a beam optics 11 (shown schematically). The beam optics 11 comprises a scanner unit, with which the laser beam formed by the optical unit 10 can be scanned across the plane 4. Further, each of the beam optics 11 of the optical units 10 comprises a focusing unit adapted to change a focus position of the respective laser beam along the beam direction. In FIG. 1, instead of the individual laser beams of the optical units 10, a beam cone 12 is shown which indicates the entire space that can be reached by the entirety of the laser beams of the optical units 10. The base of the beam cone 12 within the plane 4 thus indicates exemplary areas on the carrier 6 which can be reached by the laser beams of the optical units 10.

A Cartesian coordinate system is defined in the context of this entire disclosure as follows: a surface of the receiving portion 8 defines an x-y plane, wherein, as will be described further below, grooves for inserting the optical units 10 extend along the x-axis. Parallel to this x-y plane is the plane 4 of the top raw material layer, and also parallel thereto is a surface of the carrier 6. The z-direction is perpendicular to the x-y plane. When it is referred to herein that the optical unit 10 or the receiving portion 8 is disposed above the carrier 6, it may mean that the respective element is spaced from the carrier 6 in the positive z-direction.

The optical units 10 are arranged on the receiving portion 8 so as to provide two rows of optical units 10, wherein the optical units 10 of the two rows are arranged adjacent to each other along the y-direction, and the two rows are parallel to each other and spaced apart from each other with respect to the x-direction so that end faces of the optical elements 10 of one row face end faces of the optical elements 10 of the other row. The end faces of the optical elements 10 are the faces of the optical units 10 which extend in the y-z plane.

Figure 2:
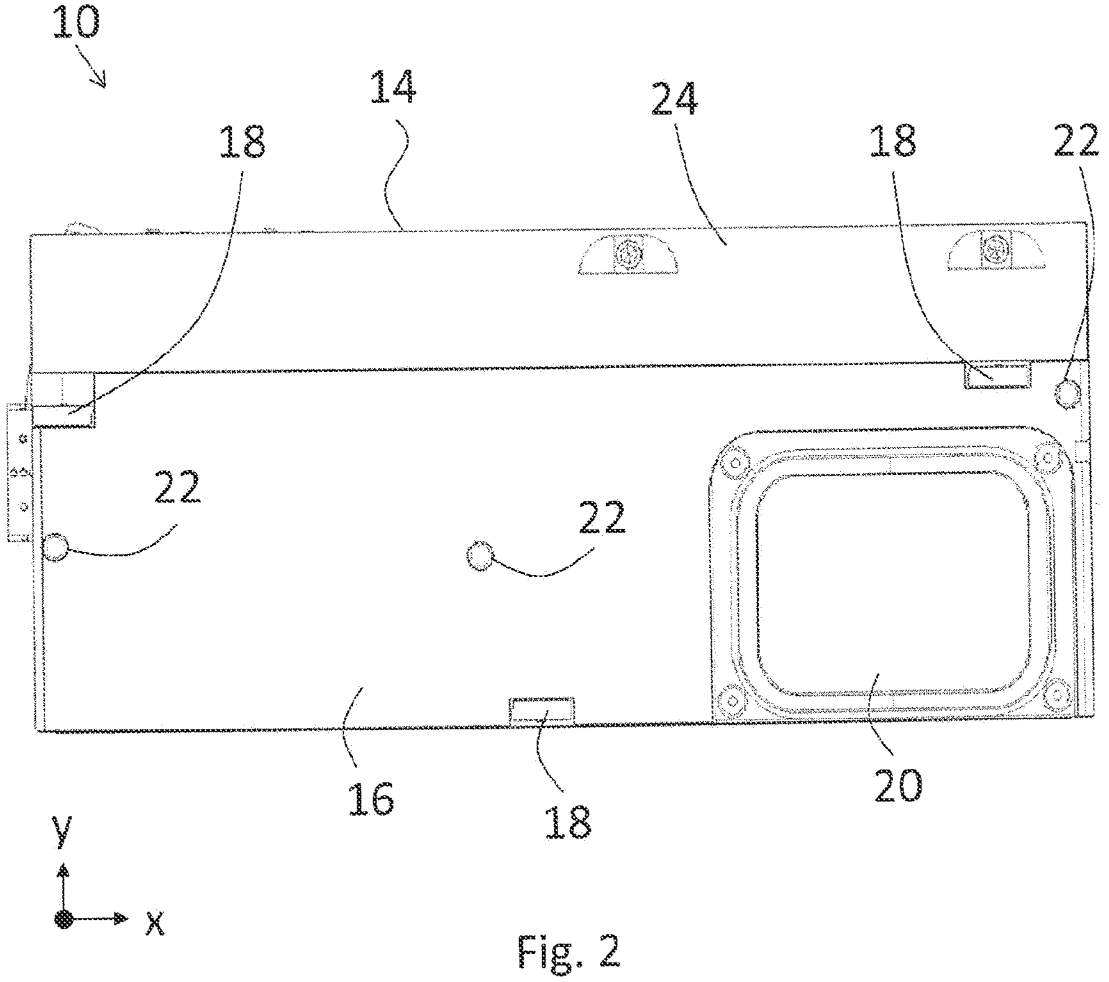
FIG. 2: a bottom view of a housing bottom of an optical unit, wherein an opening in the housing bottom and three rollers are shown.

FIG. 2 shows a view of an optical unit 10 from below (looking in the positive z-direction). The optical unit 10 comprises a housing 14 which houses a beam optics 11 comprising a plurality of optical elements (for example, laser beam source, scanner unit, etc.). The housing 14 includes a housing bottom 16 extending within an x-y plane. Further details of the geometry of the optical unit 10, which is substantially determined by the housing 14, will be described in connection with the following figures below.

Three rollers 18 are further provided on the housing bottom 16, which are adapted to roll the optical unit 10 along the x-direction. For this purpose, the rollers protrude from the housing bottom 16 by a predetermined distance in the z-direction. In the embodiment shown, the rollers 18 are substantially cylindrical in shape and allow movement in the x-direction only. However, rollers may also be provided which can rotate about the z-axis, for example, so that any rolling movements within the x-y plane are possible. As shown in FIG. 2, the three rollers 18 are offset from each other with respect to the y-direction. Further, the rollers 18 are also offset from each other with respect to the x-direction. The provision of at least one roller 18 is advantageous to allow lateral "rolling in" of the optical unit 10. However, embodiments of optical units having the improved geometry proposed herein which do not include a roller are also possible. For example, these optical units 10 may be inserted from above (along the z-direction) or may be inserted laterally along the housing bottom 16. Alternatively or additionally, rollers or sliding elements may also be provided at a location other than the housing bottom 16.

The housing bottom 16 has an opening 20. This opening 20 is an opening in that it can be penetrated by the laser beam of the optical unit 10 and is thus transparent to it. The opening 20 of the illustrated embodiment comprises a glass pane which is transparent to the laser beam.

Further, the housing bottom 16 has three holes 22 extending into the housing bottom 16 along the z-axis. A fastener (for example, a bolt or screw) can be inserted through each of these holes 22 to fix the optical unit 10 to the receiving portion 8. For this purpose, three corresponding holes are also provided in the receiving portion 8 for each of the optical units 10.

Further shown in FIG. 2 is a transition surface 24 extending from a sidewall of a lower section to a sidewall of an upper section of the optical unit 10.

Figure 3:
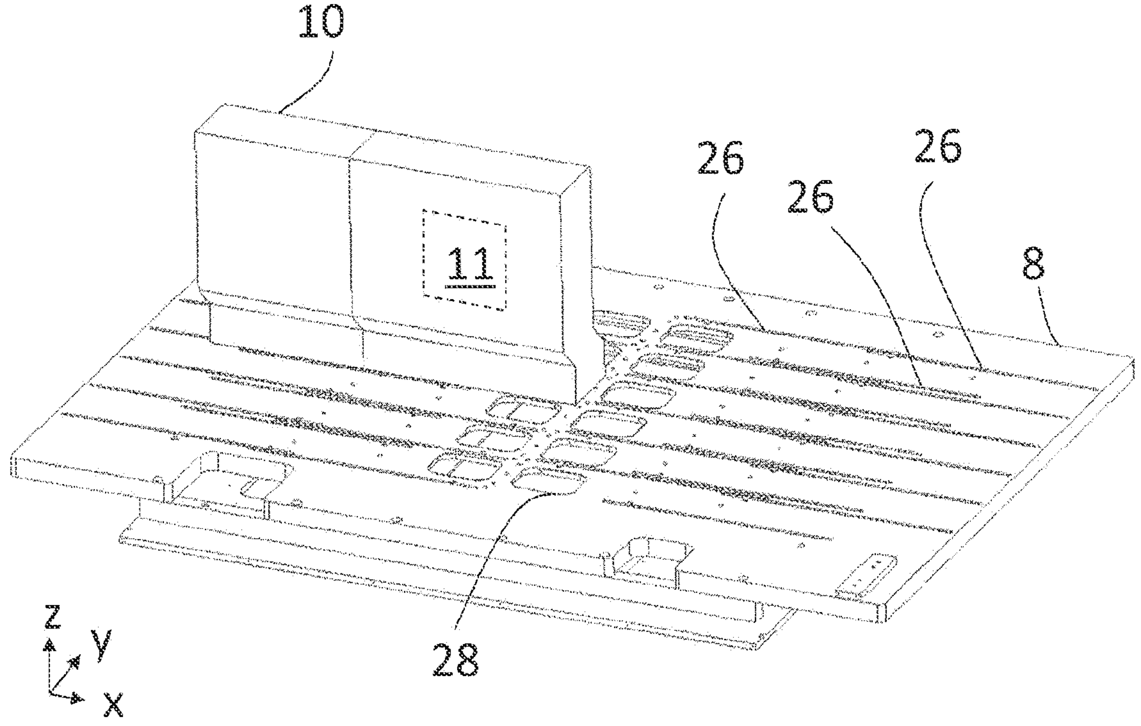
FIG. 3: a perspective view of a single optical unit arranged on a receiving portion.

FIG. 3 shows a perspective view of the receiving portion 8 and a single optical unit 10 arranged thereon. The optical unit 10 is located in an end position, i.e. in a position in which it is ready for use. Optionally, the optical unit 10 can be fastened in this end position, for example by fasteners. In FIG. 3 it can further be seen that for each optical unit 10 three grooves 26 are provided in a surface of the receiving portion 8. The number of grooves 26 per optical unit 10 thus corresponds to the number of rollers 18, so that for each roller 18 an associated groove 26 is provided. For the sake of clarity, only the three grooves 26 for one of the optical units 10 are provided with a reference sign in FIG. 3.

The grooves 26 have a rectangular cross-section with respect to a section through the y-z plane. Each of the grooves 26 is parallel to the x-direction. The grooves 26 serve to allow the optical unit 10 to be placed at one position on the grooves 26 of the receiving portion 8 (from above, i.e. along the z-direction) and then rolled along the x-direction to its respective end position. The grooves 26 may also be open towards the x-direction, so that the rollers 18 may also be inserted into the respective grooves 26 from the x-direction. Thus, the illustrated optical unit 10 has been inserted from the left (i.e., in the x-direction) and thus brought into its final position. More specifically, the optical unit 10 was first placed on the three grooves 26 in the z-direction and then moved in the x-direction so that the respective rollers 18 of the optical unit 10 roll in and are guided by the respective grooves 26.

FIG. 3 further shows that for each of the optical units 10 an associated opening 28 is provided in the receiving portion 8. The openings 28 are configured such that, in the end position of the associated optical unit 10, the opening 20 of the housing bottom 16 overlaps with the opening 28 of the receiving portion 8 so that the laser beam can pass through both openings. Similarly to the case of the opening 20 of the housing bottom 16, the opening 28 may be merely a recess or a pane (e.g. a glass pane) may be provided to cover the opening 28 and seal it, in particular in a gas-tight manner. Furthermore, a sealing ring may be provided which surrounds the opening 28 so that, after the optical unit 10 has been placed in place, no gas can escape from the opening 28 or the build chamber below it into the environment. Alternatively or additionally, a sealing ring may be provided which surrounds the opening 20 of the housing bottom 16 of the optical unit 10.

Figure 4:
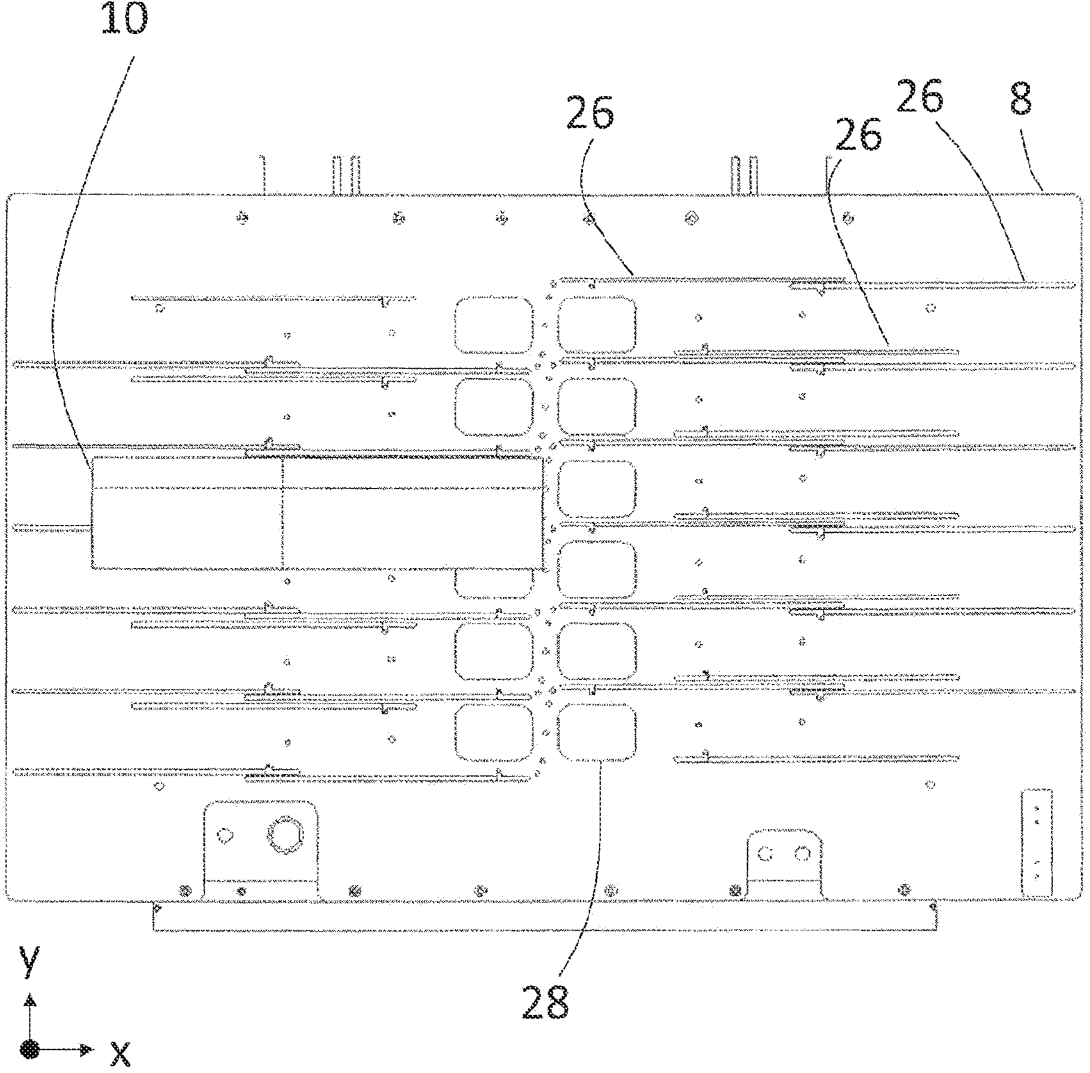
FIG. 4: a top view of the situation in FIG. 3.

FIG. 4 shows the same situation as FIG. 3, but in plan view. From this perspective, the arrangement of the grooves 26 as well as the openings 28 of the receiving portion 8 can be better seen. In FIG. 3, it can be seen that for 12 optical units 10, 12 associated placeholders (i.e. possible positions for optical units 10) are provided, each of the placeholders having an opening 28 and three grooves 26 provided on the receiving portion 8. The placeholders are arranged such that two rows of optical units 10 can be arranged on the receiving portion 8, the rows each extending in the y-direction. End faces of the individual optical units 10 (i.e., faces lying in the y-z plane) are thus adjacent to each other. Likewise, in the individual rows, side walls of the optical elements 10 are adjacent to each other, as will be described in connection with FIG. 5.

Figure 5:
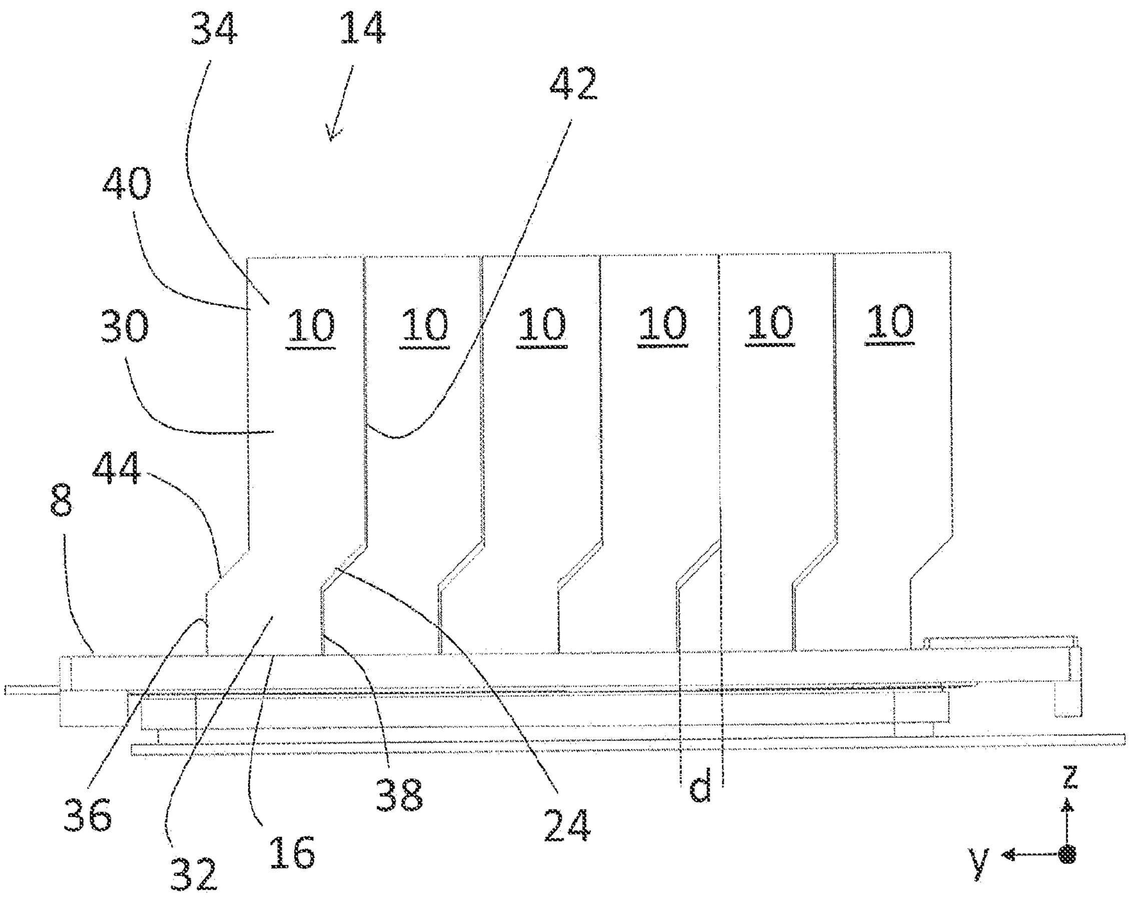
FIG. 5: a front view of a plurality of optical units arranged side by side on a receiving portion.

FIG. 5 shows a front view of a row of six optical units 10, which are arranged side by side on the receiving portion 8. All of the optical units 10 are identical in terms of the geometry of their housing 14. For this reason, the geometry of one of these housings 14 is described below by way of example. FIG. 5 shows a view with viewing direction along the x-axis and thus shows an end face 30 of the optical unit 10, which runs perpendicular to the rolling direction (x-direction) and lies in a y-z-plane. The end face 30 may be abstractly described as being s-shaped. The optical unit 10 has a lower section 32, which comprises the housing bottom 16. Above the lower section 32 (i.e., above in the z-direction) is an upper section 34 of the optical unit 10. The lower section 32 has a first side wall 36 and a second side wall 38, both of which are parallel to the rolling direction (x-direction) and each of which lies in an x-z plane. The upper section 34 also has a first side wall 40 and a second side wall 42, which also both run parallel to the rolling direction (x-direction) and each lie in an x-z plane. The first side wall 36 of the lower section 32 and the first side wall 40 of the upper section 34 run parallel to each other and are offset from each other by a certain distance d in the y-direction. Similarly, the second side wall 38 of the lower section 32 and the second side wall 42 of the upper section 34 extend parallel to each other and are offset from each other by the same distance d in the y-direction. The first side wall 36 of the lower section 32 and the first side wall 40 of the upper section 34 are connected by an inclined first connecting surface 44, which runs parallel to the rolling direction (x-direction). The second side wall 38 of the lower section 32 and the second side wall 42 of the upper section 34 connect an inclined second connecting surface 24, which is parallel to the rolling direction (x-direction). In the illustrated embodiment, the two connecting surfaces 44 and 24 are parallel to each other.

The optical units 10, by virtue of their geometry as described above, may be arranged in a row adjacent one another as follows, as shown in FIG. 5. The first side wall 36 of the lower section 32 of a first optical unit 10 is arranged adjacent to the second side wall 36 of the lower section 32 of an adjacent second optical unit 10. Likewise, the first side wall 40 of the upper section 34 of the first optical unit 10 is arranged adjacent to the second side wall 42 of the upper section 34 of the second optical unit 10. Likewise, the connecting surfaces 44 and 24 of the adjacent optical units 10 are arranged adjacent to each other. A distance between the above-described adjacent surfaces (or walls) may be chosen to be as small as possible, i.e. the respective surfaces may be directly adjacent to each other and may even contact each other if necessary. However, in order to facilitate insertion of the optical elements 10 in the x-direction, a narrow air gap is ideally provided between the respective surfaces.

From the above description of the arrangements of the optical units 10, it will be clear that one of the optical units 10 which is arranged adjacent to other optical units 10 in the y-direction on both sides cannot be easily removed (i.e., lifted) from its final position in the z-direction. Similarly, insertion of an optical unit 10 from above into a gap is not readily possible. For this reason, among others, it may be advantageous to provide the rollers 18 and grooves 26 described herein which allow insertion along the x-direction.

Figure 6:
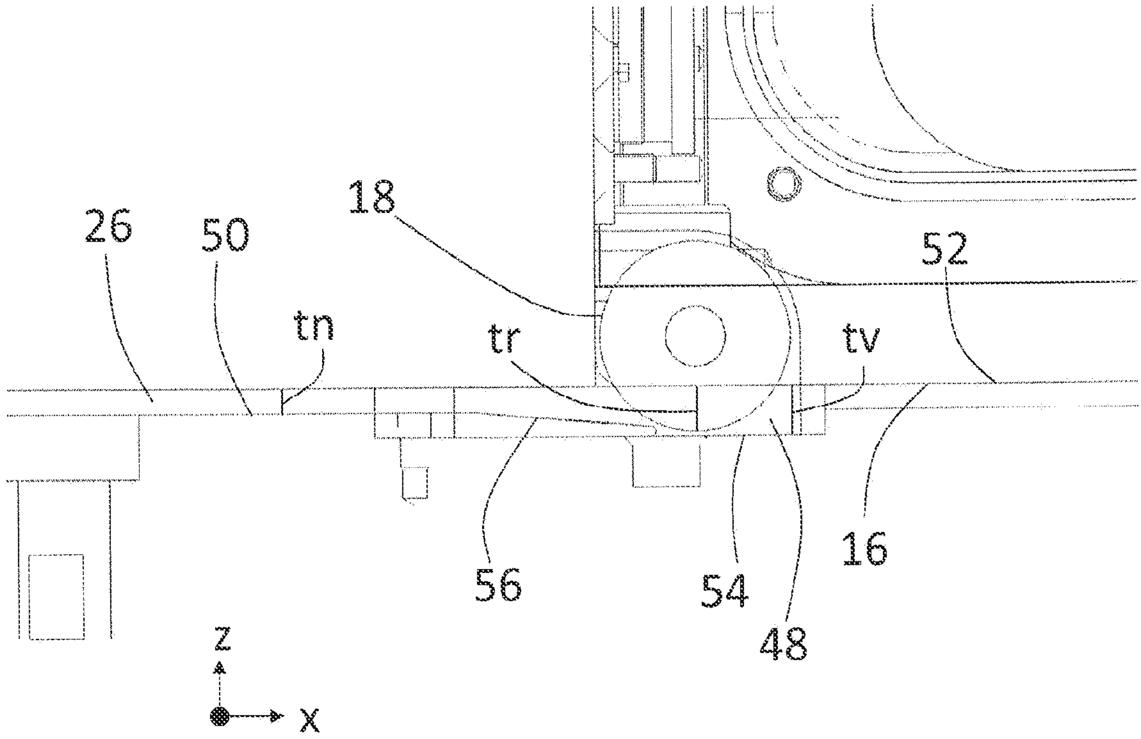
FIG. 6: a side view of an optical unit in an end position, wherein a roller of the optical unit is received by a recess of a groove of a receiving portion.

FIG. 6 shows a side view of a roller 18 of an optical unit 10, wherein the optical unit 10 is in its end position. FIG. 6 shows an example of only one of the three rollers 18 of the optical unit 10, the respective associated grooves 26 of the other rollers 18 being of comparable design. FIG. 6 shows an end portion of the groove 26 associated with the roller 18.

The groove 26 has a recess 48 (in the z-direction) at its end portion. As shown in FIG. 6, the recess 48 can receive the roller 18 of the optical unit 10. The recess 48 is provided with respect to a bottom surface 50 of the groove 26. More specifically, the groove 26 already constitutes a "recess" by a depth tn with respect to a surface 52 of the receiving portion 8 and the recess 48 forms a (further) recess with respect to the bottom surface 50 of the groove 26. With respect to the surface 52 of the receiving portion 8, the recess 48 has a depth tv which is greater than the depth tn.

As shown in FIG. 6, when the optical unit 10 is in its end position and the roller 18 is received by the recess 48, the roller 18 does not contact a bottom 54 of the recess 48. Figuratively speaking, the roll 18 is suspended in the air. This is because a distance tr that the roller 18 protrudes from the housing bottom 16 is less than the depth tv of the recess. Thus, in this condition, the housing bottom 16 rests on the surface 52 of the receiving portion 8. Starting from this state, a certain initial force must be overcome in order to roll the optical unit 10 back out of its recess.

An inclined transition surface 56 is provided between the bottom surface 50 of the groove 26 and the recess 48. The roll 18 can be rolled into and out of the recess 48 over this inclined transition surface 56. The transition surface 56 may thus also be referred to as a ramp. In the embodiment shown, it is an inclined plane.

Figure 7:
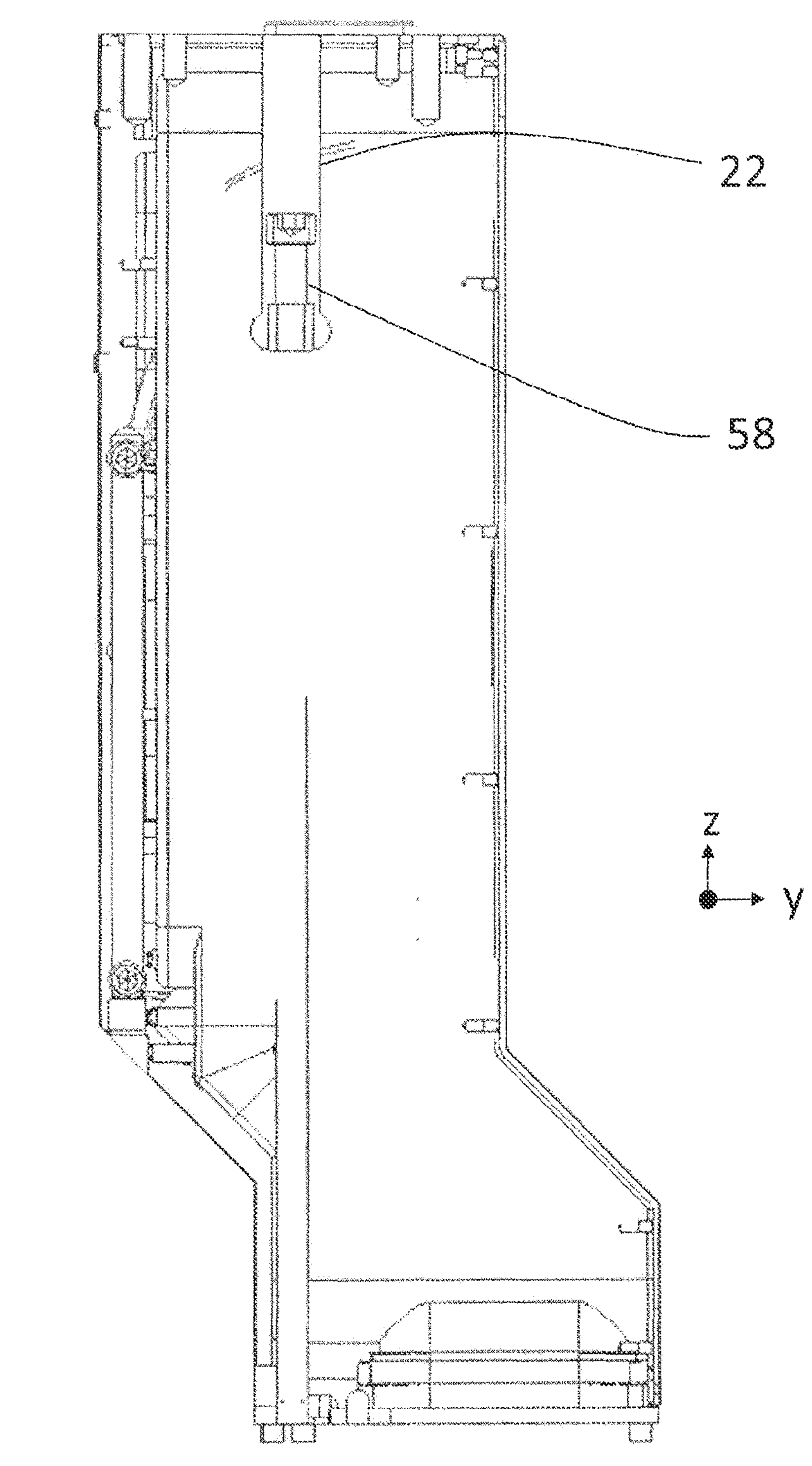
FIG. 7: a section through a y-z plane of an optical unit, wherein a hole and a fastener are shown.

In order to provide additional fixation of the optical unit 10 to the receiving portion 8, screws 58 are turned through the holes 22 of the optical unit 10 and through corresponding holes of the receiving portion 8 in the final position of the optical unit 10, so that the optical unit 10 is firmly connected to the receiving portion 8. This is shown in the sectional view of FIG. 7.

A single optical unit 10 can be removed from its end position as follows. For this purpose, the screws 58 are first loosened. Then, the optical unit 10 can be rolled along the x-direction over the receiving portion 8. Thus, lateral removal is made possible even if the optical unit 10 is enclosed on three sides by further optical unit 10. In an analogous manner, the optical unit 10 can be reinserted into the gap after repair or another optical unit 10 without having to remove the adjacent optical unit 10.

Thus, by the above-described technique, an improved geometry for an optical unit 10 is presented so that it can be arranged on a receiving portion 8 in a space-saving manner.

The invention claimed is:

1. An apparatus for producing a three-dimensional workpiece by means of a beam melting process, the apparatus comprising an optical unit and a further optical unit of identical construction, wherein the optical unit comprises:

a beam optics for generating a laser beam and directing the laser beam to a predetermined location, the beam optics comprising a scanning unit for two-dimensionally scanning the laser beam over a top layer of raw material, and a housing having a housing bottom and an opening provided in the housing bottom which is transparent to the laser beam so that the laser beam can pass through the opening, wherein the optical unit comprises a lower section comprising the housing bottom and having two side walls each extending parallel to a first direction, and an upper section connected to the lower section and having two side walls each extending parallel to the first direction, the lower section and the upper section being arranged offset from each other such that a first side wall of the side walls of the lower section does not extend in the same plane as a first side wall of the side walls of the upper section and a second side wall of the side walls of the lower section does not extend in the same plane as a second side wall of the side walls of the upper section, wherein the further optical unit of identical construction is placed adjacent to the optical unit, such that the second side wall of the lower section of the optical unit is arranged adjacent to a first side wall of a lower section of the further optical unit and the second side wall of the upper section of the optical unit is arranged adjacent to a first side wall of an upper section of the further optical unit, wherein a first connecting surface connects the first side wall of the lower section to the first side wall of the upper section and a second connecting surface connects the second side wall of the lower section to the second side wall of the upper section, wherein each of the first connecting surface and the second connecting surface is inclined relative to the side walls of the lower section and the side walls of the upper section.

2. The apparatus according to claim 1, wherein the side walls of the lower section are parallel to each other and the side walls of the upper section are parallel to each other.

3. The apparatus according to claim 1, the optical unit further comprising:

at least one roller provided on the housing bottom, by means of which the optical unit can be rolled along at least the first direction, the first direction corresponding to a rolling direction.

4. The apparatus according to claim 3, wherein the optical unit comprises at least three rollers provided on the housing bottom, all of which are offset from each other along a direction perpendicular to the rolling direction.

5. The apparatus according to claim 3, wherein the housing bottom comprises at least one hole adapted to receive a fastener.

6. An apparatus for producing a three-dimensional workpiece by means of a beam melting process, comprising:

a carrier for receiving a plurality of layers of a raw material, a receiving portion arranged above the carrier and having at least one groove provided in the receiving portion, and the apparatus according to claim 3, wherein the at least one roller of the optical unit and the at least one groove of the receiving portion are configured such that the at least one roller can roll along and is guided by the at least one groove.

7. The apparatus according to claim 6, wherein an associated groove is provided in the receiving portion for each of the rollers of the optical unit.

8. The apparatus according to claim 6, wherein the at least one groove has a recess at an end portion of the groove for receiving an associated roller of the optical unit, the recess being provided with respect to a bottom surface of the groove.

9. The apparatus according to claim 8, wherein the recess is configured such that the associated roller does not contact a bottom of the recess when the associated roller is received by the recess and the optical unit is in an end position.

10. The apparatus according to claim 8, wherein an inclined transition surface is provided between the bottom surface of the groove and the recess.

11. The apparatus according to claim 6, wherein the housing bottom comprises at least one hole, and further comprising at least one fastener adapted to be inserted into the at least one hole of the housing bottom of the optical unit, so as to fasten the optical unit to the receiving portion of the apparatus.

12. The apparatus according to claim 6, wherein the receiving portion comprises an opening transparent to the laser beam and adapted to at least partially overlap with an opening of the optical unit in an end position of the optical unit so that the laser beam can be directed through the opening of the optical unit and through an opening of the receiving portion.

13. The apparatus according to claim 12, wherein a seal extending around the opening of the receiving portion and/or around the opening of the optical unit is provided.

14. The apparatus according to claim 1, wherein the apparatus comprises a plurality of the optical unit, which are arranged side by side.

* * * * *